(12) United States Patent
Nishiba (10) Patent No.: US 9,963,025 B2
(45) Date of Patent: May 8, 2018

(54) DEFLECTOR STRUCTURE FOR SUNROOF DEVICE

(71) Applicant: YACHIYO INDUSTRY CO., LTD., Sayama-shi, Saitama (JP)

(72) Inventor: Tamotsu Nishiba, Sayama (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days. days.

(21) Appl. No.: 15/507,421

(22) PCT Filed: Jul. 14, 2015

(86) PCT No.: PCT/JP2015/070109
§ 371 (c)(1),
(2) Date: Feb. 28, 2017

(87) PCT Pub. No.: WO2016/035456
PCT Pub. Date: Mar. 10, 2016

(65) Prior Publication Data
US 2017/0282698 A1    Oct. 5, 2017

(30) Foreign Application Priority Data
Sep. 3, 2014   (JP) .................................. 2014-178866

(51) Int. Cl.
*B60J 7/22*  (2006.01)
*B60J 7/043* (2006.01)

(52) U.S. Cl.
CPC ................. *B60J 7/22* (2013.01); *B60J 7/043* (2013.01)

(58) Field of Classification Search
CPC .................................... B60J 7/22; B60J 7/223
USPC ........................................................ 296/217
See application file for complete search history.

(56) References Cited

U.S. PATENT DOCUMENTS

| 2004/0189057 A1 | 9/2004 | Grimm et al. |
| 2010/0313486 A1 | 12/2010 | Kuribayashi et al. |
| 2012/0248828 A1 | 10/2012 | Fukami et al. |

FOREIGN PATENT DOCUMENTS

| DE | 196 03 670 C1 | 4/1997 |
| DE | 101 30 405 A1 | 1/2003 |
| FR | 2 845 038 A1 | 4/2004 |
| JP | 2008-500222 A | 1/2008 |
| WO | 2008/031428 A1 | 3/2008 |

*Primary Examiner* — Dennis H Pedder
(74) *Attorney, Agent, or Firm* — Carrier Blackman & Associates, P.C.; Joseph P. Carrier; William D. Blackmar (57) ABSTRACT

Provided is a deflector structure for a sunroof device, including: a thin cloth member that extends in a tensioned state to smooth a drive airflow when a roof panel is opened, and is folded when the roof panel is closed; a housing section that is disposed below the roof panel to house the folded thin cloth member; a lower holder provided at the housing section to fix a lower end portion of the thin cloth member; and an upper holder that is fixed at an upper end portion of the thin cloth member, and is housed together with the thin cloth member into the housing section when the roof panel is closed.

4 Claims, 5 Drawing Sheets

DEFLECTOR STRUCTURE FOR SUNROOF DEVICE

TECHNICAL FIELD

The present invention relates to a deflector structure for a sunroof device.

BACKGROUND ART

As a sunroof device, there is one provided with a deflector for the purpose of reducing entrainment of airstream into a vehicle compartment during driving in a state that a roof panel is opened. As a conventional example of a deflector, known is a so-called net deflector, which is provided with a net (a thin cloth member) of a soft fabric material with a fine mesh (for example, see Patent Document 1). This net deflector is structured such that when a roof panel is opened, a thin cloth member extends in a tensioned state such as to stand to thereby smooth a drive airflow, and when the roof panel is closed, the thin cloth member is folded to be housed below the roof panel.

RELATED ART DOCUMENT

Patent Literature

Patent Literature 1: JP 2008-500222 A

DISCLOSURE OF THE INVENTION

Problems to be Solved by the Invention

However, the above deflector structure for a sunroof device has a structure in which, when the roof panel is closed, an upper holder fixing the upper end portion of the thin cloth member is housed posterior than a lower holder for fixing the lower end portion of the thin cloth member. Consequently, the housing space of the housing section expands in the front-rear direction of the vehicle body, which caused a problem of narrowing the opening of the sunroof device is in the front-rear direction of the vehicle body.

Figure 5:
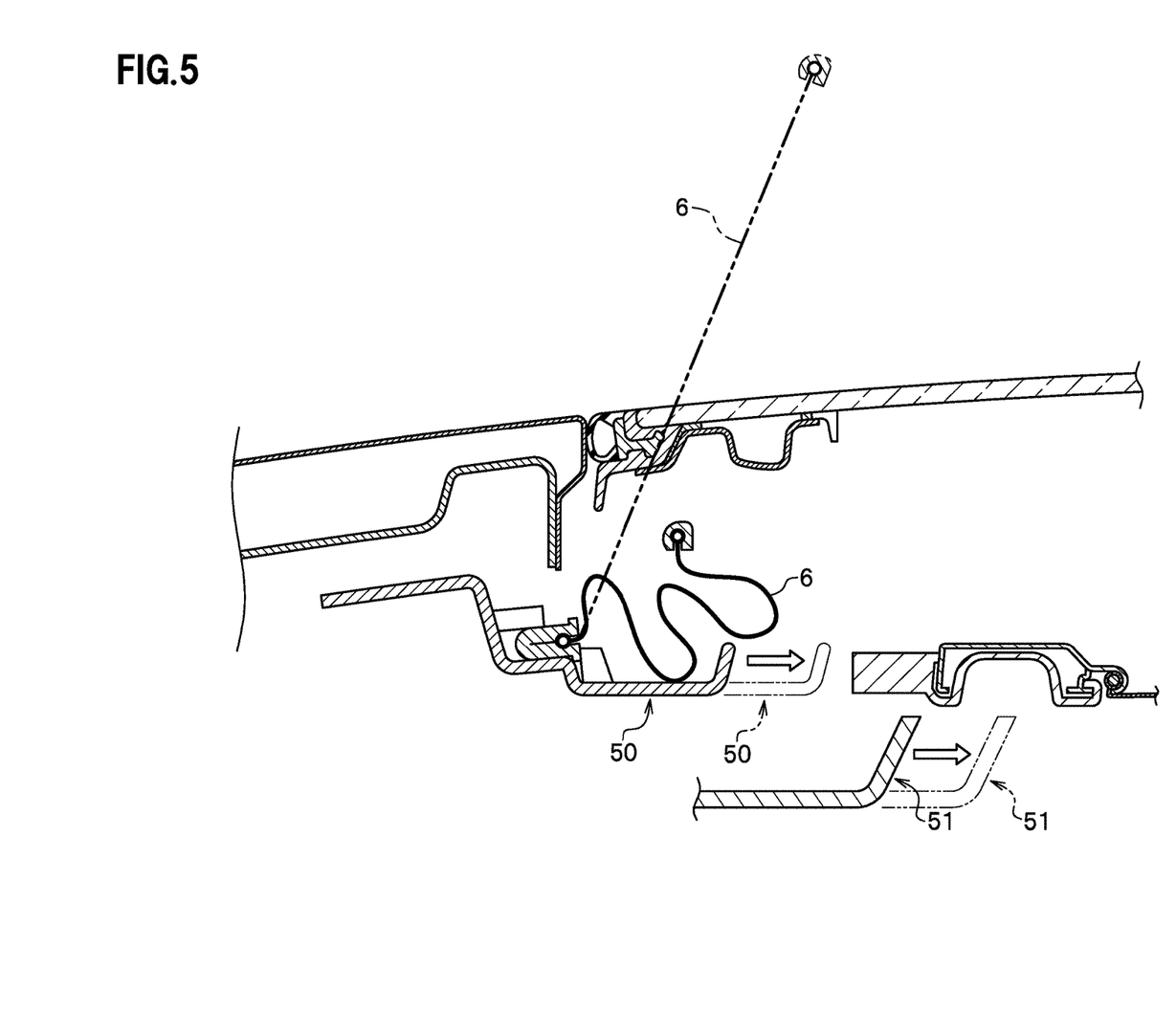
FIG. 5 is a side cross-sectional view showing a conventional art.

The thin cloth member of a net deflector is a soft fabric material. Accordingly, each time of housing, the folded shape of the thin cloth member tends to vary. Consequently, in some cases, when a thin cloth member 6 for a deflector structure, such as shown in FIG. 5, is folded, a part of the thin cloth member 6 may move backward out of a housing section 50 to be exposed to the inside of a vehicle compartment. Such exposure of the thin cloth member 6 can be prevented by extending a housing section 50 backward to make it large, as shown in FIG. 5 by the alternate long and two short dashes lines.

However, as described above, if the housing section 50 is extended backward, it is necessary, accompanying the extension, to extend a roof lining 51 posterior than a vehicle body, which undesirably results in correspondingly narrowing an opening of a sunroof device.

The present invention has been created in order to solve the above-described problem, and an object of the invention is, regarding a deflector structure for a sunroof device that extends a thin cloth member in a tensioned state to smooth an airflow, to reduce the exposure of a thin cloth member to the inside of a vehicle compartment without enlarging a housing space.

Means for Solving the Problems

In order to solve the above-described problems, a structure includes: a thin cloth member that extends in a tensioned state to smooth a drive airflow when a roof panel is opened, and is folded when the roof panel is closed; a housing section that is disposed below the roof panel and provided with a front wall, a bottom wall, and a rear wall to house the folded thin cloth member; a lower holder provided at the housing section to fix a lower end portion of the thin cloth member; and an upper holder that is fixed at an upper end portion of the thin cloth member, and is housed together with the thin cloth member into the housing section when the roof panel is closed, wherein, in the housing section, an extension portion that guides the thin cloth member, the thin cloth member having been guided out from the lower holder, to an upper portion of the housing section through a gap formed between the extension portion and a rear surface of the front wall is provided on an upper side of the lower holder.

According to the invention, the thin clothing member is guided by the extension portion from the lower holder to the upper portion of the housing section, and thereafter folded back to be housed into the housing section. Accordingly, it is possible to effectively use the housing space in the upper-lower direction of the housing section, in housing the thin cloth member. Thus, the exposure of the thin cloth member to the inside of the vehicle compartment can be reduced without making the housing space large.

Still further, according to the invention, the upper holder includes: an upper portion; a front portion extending downward from a front end of the upper portion; and a rear portion extending downward from a rear end of the upper portion, wherein the rear portion is formed longer in an upper-lower direction than the front portion.

According to the invention, the thin sloth member can be satisfactorily inhibited by the rear portion from becoming backward out of the thin clothing member.

Yet further, according to the invention, when the roof panel is closed, the rear portion overlaps with the lower holder in the front-rear direction.

According to the invention, it is possible to further satisfactorily inhibit the thin cloth member from becoming out backward, while saving the space, in the front-rear direction, in the vehicle body.

Still further, according to the invention, a structure includes a reinforcement member that is arranged on a lower side of a front portion of the roof panel to reinforce the roof pane, wherein, accompanying an operation in which the roof panel is closed, the reinforcement member enters a region that is located lower than a lower end portion of the upper holder housed in the housing section and anterior than a rear end portion of the housing section.

According to the invention, even if a part of the thin cloth member becomes backward out of the housing section when the thin cloth member is folded, if the roof panel is closed, the thin cloth member can be housed into the housing section, being pushed by the reinforcement member. It is thereby possible to inhibit the thin cloth member from being exposed to the inside of a vehicle compartment without making a housing space large.

Advantage of the Invention

According to the present invention, it is possible to reduce the exposure of a thin cloth member to the inside of a vehicle compartment without enlarging a housing space.

BRIEF DESCRIPTION OF THE DRAWINGS

FIGS. 4A to 4C show actions taken when a roof panel is closed, wherein

EMBODIMENT FOR CARRYING OUT THE INVENTION

Outline of Sunroof Device

Figure 1:
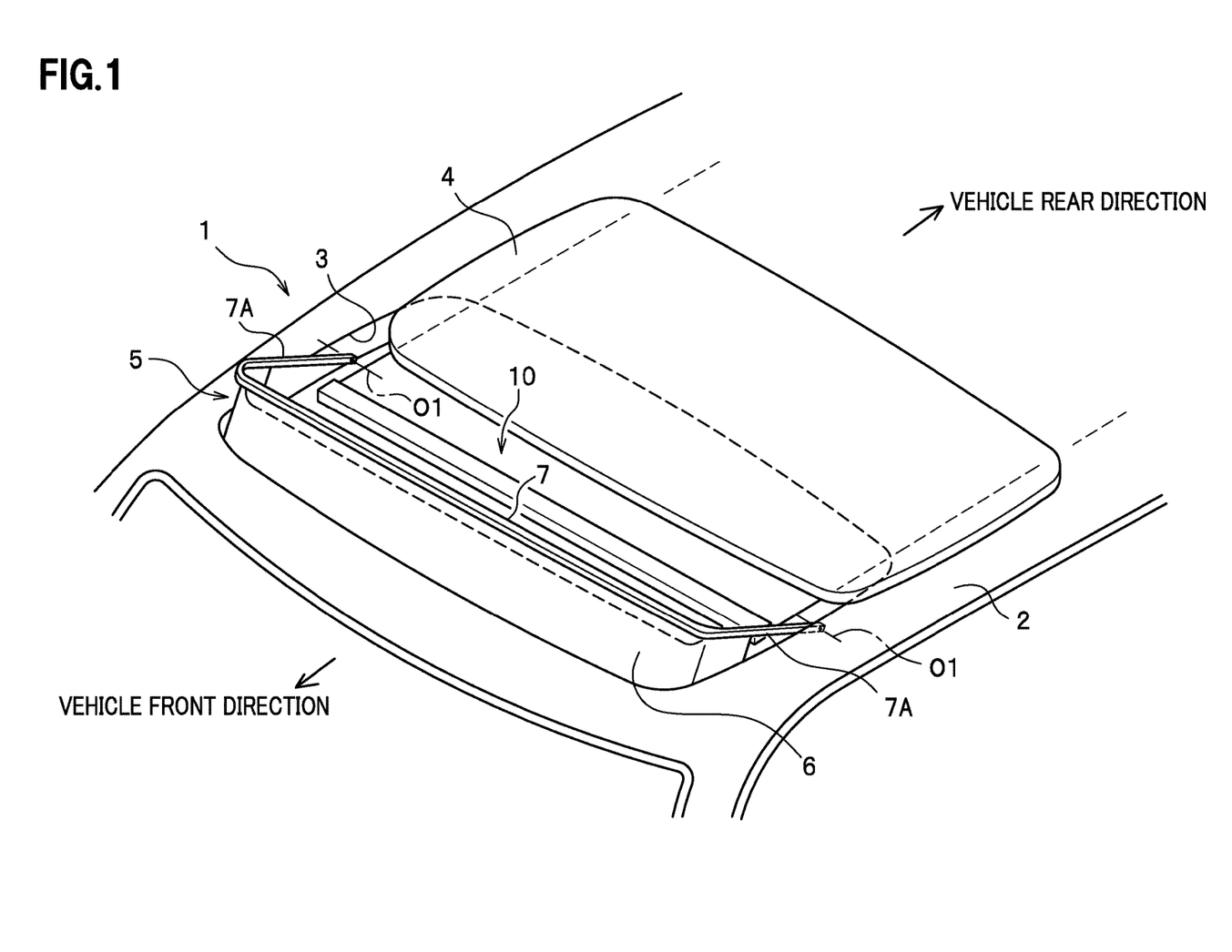
FIG. 1 shows an appearance perspective view of a sunroof device.

In FIG. 1, a sunroof device 1 is provided with a roof panel 4 that opens and closes an opening portion 3 substantially in a rectangular shape formed through a fixed roof 2 of a vehicle body, and provided with a deflector 5 that protrudes upward along the front margin of the opening portion 3 from the fixed roof 2 when the roof panel 4 slides backward and the opening portion 3 opens. Further, a sunshade device 10 for daylighting and light blocking for the opening portion 3 is provided below the roof panel 4.

Figure 2:
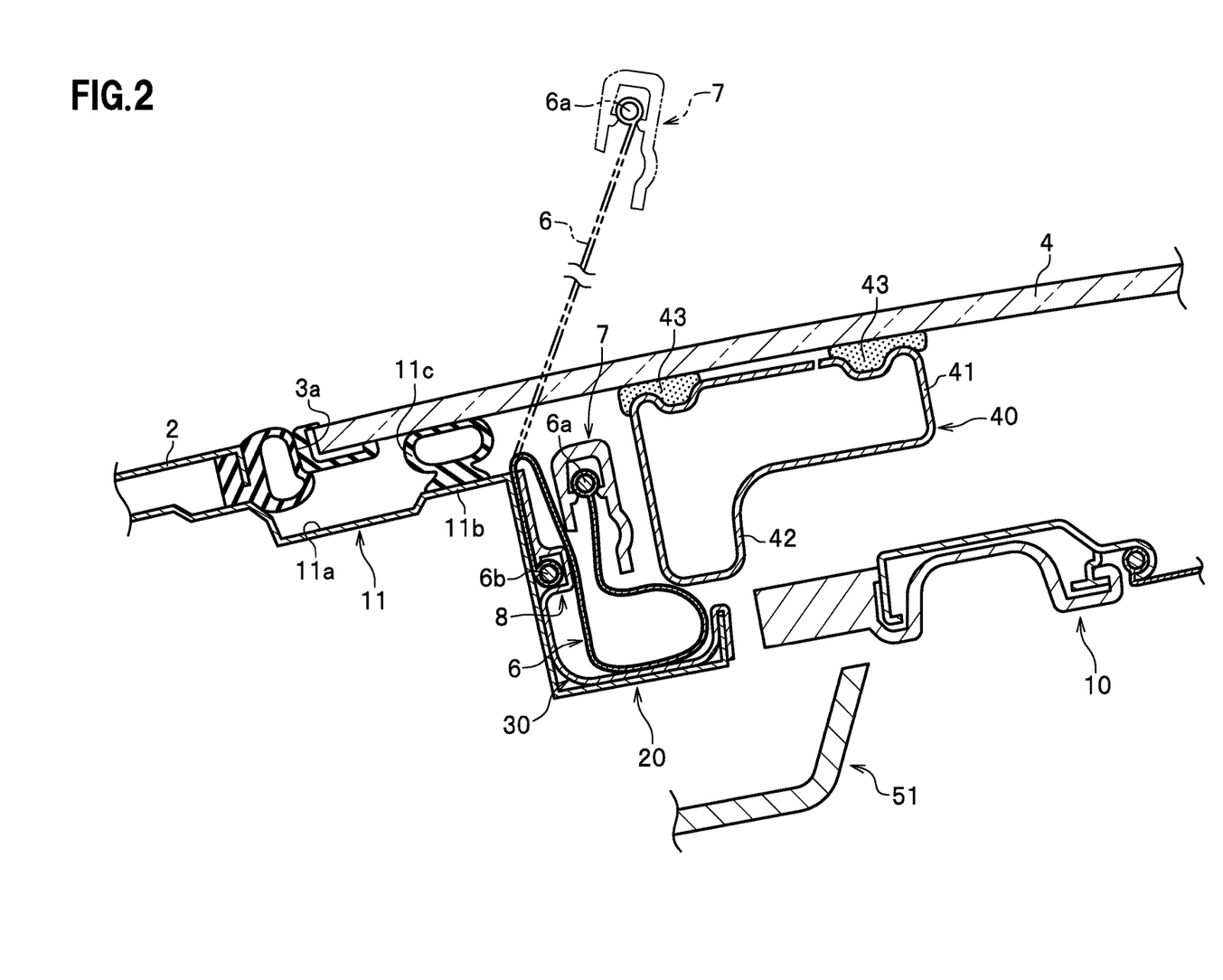
FIG. 2 is a side cross-sectional view showing a structure of the periphery of a deflector.
Figure 3:
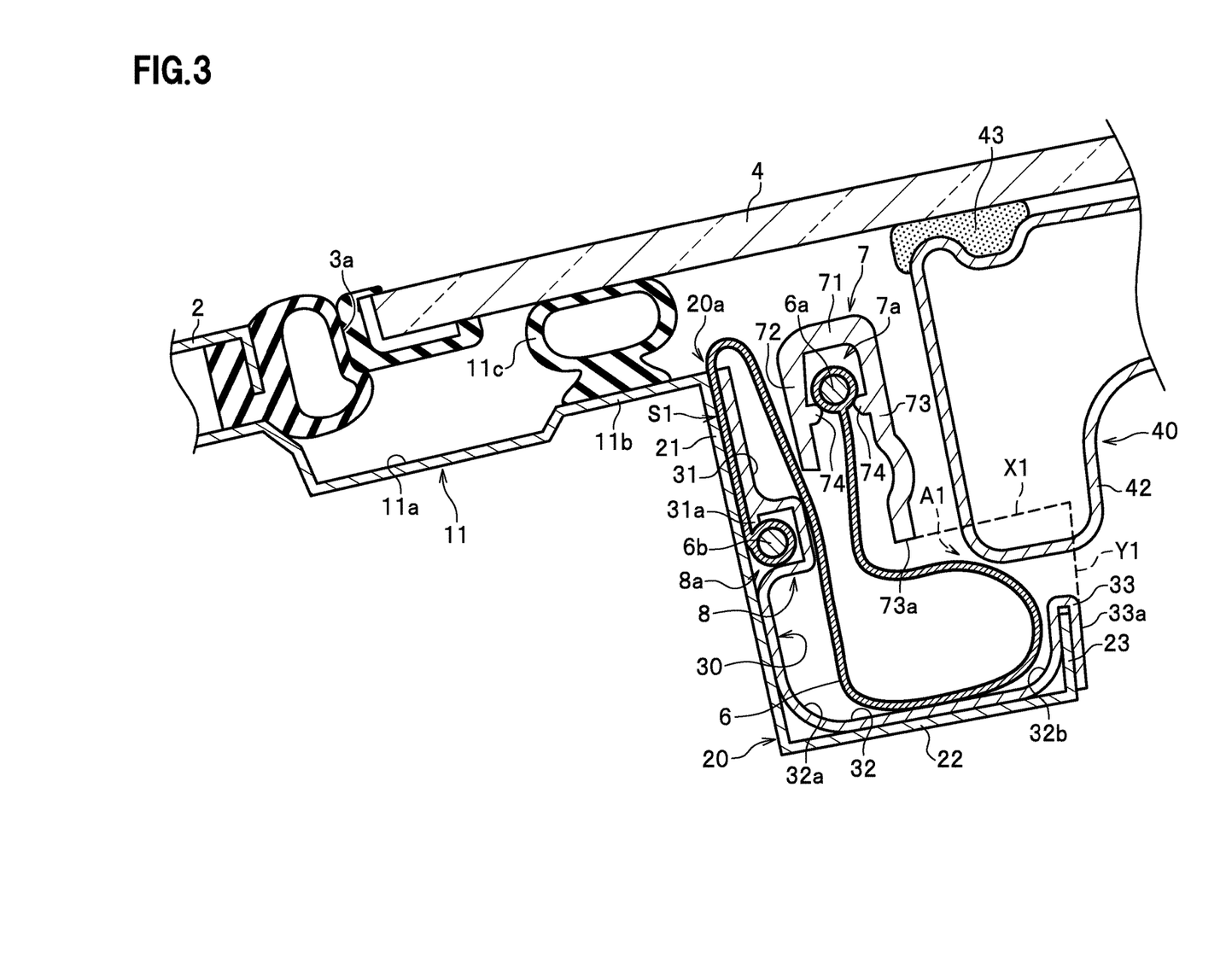
FIG. 3 illustrates the action of a thin cloth member housed in a housing section.

As shown in FIG. 2, the deflector 5 is provided with the thin cloth member 6, an upper holder 7 for supporting the upper side of the thin cloth member 6, a lower holder 8 for supporting the lower side of the thin cloth member 6. The thin cloth member 6 is formed by a net of a soft fabric material with a fine mesh. The upper margin and the lower margin of the thin cloth member 6 are, as shown in FIG. 3, respectively formed by suture or the like in a bag shape in a side cross-sectional view, and the core members 6a, 6b inserted through the respective bag portions are fixed by fitting insertion to the groove portion 7a of the upper holder 7 and a groove portion 8a of the lower holder 8. The upper holder 7 and the lower holder 8 are formed from a resin material for example.

As shown in FIG. 1, the both ends of the upper holder 7 are formed as deflector arms 7A, 7A extending backward. The rear end of the deflector arm 7A is supported rotatably around a rotation shaft O1 along the vehicle transverse direction. To the deflector arm 7A, fitted is an elastic member (not shown) for always rotationally urging the upper holder 7 around the rotation shaft O1 in the direction where the upper holder 7 protrudes upward. As shown in FIG. 2, the lower holder 8 is arranged in a housing section 20. The housing section 20 is arranged at the rear portion of a roof frame 11. The details of the upper holder 7, the lower holder 8, and the housing section 20 will be described later.

Below the each side margin of the opening portion 3, arranged is a side frame (not shown) having a function to guide the slide of the roof panel 4, a function to support the deflector arm 7A, and a function to support the above elastic member. The roof frame 11 is formed as a member longitudinal in the transverse direction such as to connect the respective front ends of the both side frames. As shown in FIG. 2, the roof frame 11 is provided with a drain groove 11a below the front end opening portion 3a of the fixed roof 2. The drain groove 11a is slightly inclined front down to pattern after the anterior fixed roof 2. An inclined portion 11b between the drain groove 11a and the housing section 20 is provided with a sealing member 11c in contact with the lower surface of the roof panel 4. The roof frame 11 is formed from a metal material for example.

In such a manner, when the roof panel 4 is closed, a pressure shoe (not shown), which is arranged on the lower surface of the roof panel 4, presses down the deflector arm 7A against the urging force of the above elastic member, and the upper holder 7 is thereby downward displaced to fold the thin cloth member 6 so that the thin cloth member 6 is housed above the roof frame 11. When the roof panel 4 opens and the pressure from the above pressure shoe against the deflector arm 7A is released, the urging force of the above elastic member displaces the upper holder 7 upward so that the thin cloth member 6 extends in a tensioned state to smooth the drive airflow and thus reduce entrainment of airstream into a vehicle compartment.

Structure of Deflector

The structure of the deflector in the present embodiment is provided with the housing section 20, the upper holder 7, the lower holder 8, which are described above, and a reinforcement member 40 arranged on the roof panel 4.

As shown in FIG. 2, the housing section 20 is substantially in an L-shape in a side cross-sectional view, and houses the thin cloth member 6 when the roof panel 4 is closed. As shown in FIG. 3, the housing section 20 is provided with, in the order from the front, a front wall 21, a bottom wall 22, and a rear wall 23. The front wall 21 bends from the rear end of the inclined portion 11b and extends backward and obliquely downward. The bottom wall 22 bends from the lower end of the front wall 21, and extends backward and obliquely upward to pattern after the inclination of the roof panel 4. The rear wall 23 bends from the rear end of the bottom wall 22, and extends upward. The rear wall 23 is located lower than the front wall 21. In such a manner, the range, of the housing section 20, from the upper end portion of the front wall 21 to the upper end portion (the upper end portion of the rear plate 33 of a attaching member 30) of the rear wall 23 is the opening portion (the entrance and exit of the thin cloth member 6) of the housing section 20.

The attaching member 30 having the lower holder 8 is attached to the housing section 20. The attaching member 30 is attached such as to cover the entire inner surface of the housing section 20, and is provided with a front plate 31 covering the inner surface of the front wall 21, a bottom plate 32 covering the upper surface of the bottom wall 22 continuously from the front plate 31, and the rear plate 33 covering the front surface and the rear surface of the rear wall 23 continuously from the bottom plate 32. The front plate 31 is provided with the lower holder 8 in a groove shape such as to adjoin the front wall 21 of the housing section 20. The lower holder 8 is located substantially at the central portion in the upper-lower direction of the front plate 31, and the lower end portion of the bag shape of the thin cloth member 6 is fitted, together with the core member 6b, to the inner side of the lower holder 8. When the roof panel 4 is closed, the lower holder 8 is disposed at a position, which is offset on the lower side in the upper-lower direction than the upper holder 7 disposed at the opening portion of the housing section 20. That is, the lower holder 8 is disposed with a position relationship (relationship without interference in the front-rear direction) in which the later-described front portion 72 of the upper holder 7 does not overlap in the front-rear direction with the backward protruding portion of the lower holder 8. The thin cloth member 6 guided out from the lower holder 8 is guided, through a gap S1 formed between the rear surface of the front wall 21 and the front surface of the front plate 31, to the upper end portion 20a (upper portion) of the housing section 20. Thus, when the roof panel 4 opens, the thin cloth member 6 protrudes above the opening portion 3 from the upper end portion 20a of the housing section 20. When the roof panel 4 is closed, the thin cloth member 6 is folded in a curved shape from the upper end portion 20a of the housing section 20 toward the inside of the housing section 20 (the state shown in FIG. 2). Incidentally, an engage stop piece 31a for preventing moving-off is arranged, protruding from the margin of the upper opening of the lower holder 8. The upper portion (the part on the upper side of the lower holder 8) of the front plate 31, which guides, as described above, the thin cloth member 6 to the upper end portion 20a of the housing section 20, is corresponding to 'extension portion' described in claim.

The corner portion 32a between the front plate 31 and the bottom plate 32 and the corner portion 32b between the bottom plate 32 and the rear plate 33 are curved in an R-shape to hold with curvature the thin cloth member 6. The rear plate 33 is in an inverse U-shape and attached to the rear wall 23 from above such as to cover it. The height of the rear plate 33 is made lower than the front plate 31 to pattern after the height of the rear wall 23. Thus, the attaching member 30 is structured to have an opening portion with a range from the upper end portion of the front plate 31 to the upper end portion of the rear plate 33. The thin cloth member 6 enters and exits the housing section 20 (attaching member 30) through this opening portion.

The bag-shaped upper end portion of the thin cloth member 6 is fitted to the inside of the upper holder 7 together with the core member 6a. When the roof panel 4 is closed, the upper holder 7 is, as shown in FIG. 3, disposed at the opening portion of the housing section 20. Incidentally, a part (the lower portions of the front portion 72 and a rear portion 73 described later) of the upper holder 7 is disposed in the inner space of the housing section 20 (the inner space of the attaching member 30, the same hereinafter) through the opening portion. The upper holder 7 has a substantially U-shaped cross-section and is provided with an upper portion 71, the front portion 72 extending downward from the front end of the upper portion 71, and the rear portion 73 extending downward from the rear end of the upper portion 71. The rear portion 73 is formed longer in the upper-lower direction, compared with the front portion 72. When the roof panel 4 is closed, the rear portion 73 is disposed such as to overlap with the lower holder 8 in the front-rear direction (such that the rear portion 73 overlaps with the lower holder 8 in a rear view, not shown). In other words, the rear portion 73 is disposed, effectively using the rear space of the lower holder 8. Incidentally, an engage stop piece 74 for preventing moving-off is protruded at the facing portion between the front portion 72 and the rear portion 73.

The reinforcement member 40 is, as shown in FIG. 2, arranged in the vicinity of the front end portion of the lower surface of the roof panel 4. The reinforcement member 40 is provided with a root portion 41, which is fixed through a bonding agent 43 to the lower surface of the roof panel 4, and a protruding portion 42 protruding downward from the front end lower portion of the root portion 41. When the roof panel 4 is closed, at least a part of the reinforcement member 40 can enter the opening portion of the housing section 20. In the present embodiment, at least a part of the protruding portion 42 of the reinforcement member 40 can enter the opening portion. Concretely, as shown in FIG. 3, the lower portion of the protruding portion 42 can enter a region A1 (the region shown by dashed lines in FIG. 3) that is located lower than the lower end portion 73a of the rear portion 73 of the upper holder 7 housed in the housing section 20, and anterior than the rear surface 33a of the rear plate 33, the rear surface 33a being the rear end portion of the housing section 20 (the attaching member 30). Herein, the region A1 is a region partitioned by a reference line X1 and a reference line Y1. The reference line X1 is a line that passes the lower end portion 73a of the rear portion 73 of the upper holder 7 and is substantially parallel to the bottom wall 22 of the housing section 20. The reference line Y1 is a line that extends upward along the rear surface 33a of the rear plate 33 of the housing section 20.

Action

In FIG. 2, the thin cloth member 6 is extended in a tensioned state, obliquely standing such that the upper side thereof is backward displaced.

In FIG. 1, when the roof panel 4 closes and the above pressure shoe presses down the deflector arm 7A around the rotation shaft O1, the upper holder 7 is housed into the housing section 20, as shown in FIG. 3. The upper holder 7 in a housed state is disposed at a position posterior than and obliquely above the lower holder 8 (at a position offset on the upper side from the lower holder 8). In such a manner, in the housing section 20, the lower holder 8 and the upper holder 7 are disposed lower and upper, and the upper holder 7 can be disposed adjacent to the lower holder 8 and on the front part of the housing section 20. Accordingly, the thin cloth member 6 is folded and housed in a state of being inhibited from moving backward out.

Further, as the rear portion 73 of the upper holder 7 is formed longer in the upper-lower direction than the front portion 72, accompanying the operation of housing the upper holder 7, the thin cloth member 6 guided out from the upper holder 7 is satisfactorily pressed by the rear portion 73 and thereby satisfactorily guided into the housing section 20.

Further, as the rear portion 73 is located posterior than the lower holder 8 and disposed in a state of overlapping in the front-rear direction with the lower holder 8, the thin cloth member 6 guided out from the upper holder 7 turns into a state of being satisfactorily pressed by the rear portion 73 so that, accompanying the operation of housing the upper holder 7, the thin cloth member 6 is satisfactorily guided into the housing section 20.

The following is the description of action in a case that a part of the thin cloth member 6 is disposed backward out of the housing section 20 in a state that the upper holder 7 is housed in the housing section 20.

Figure 4A:
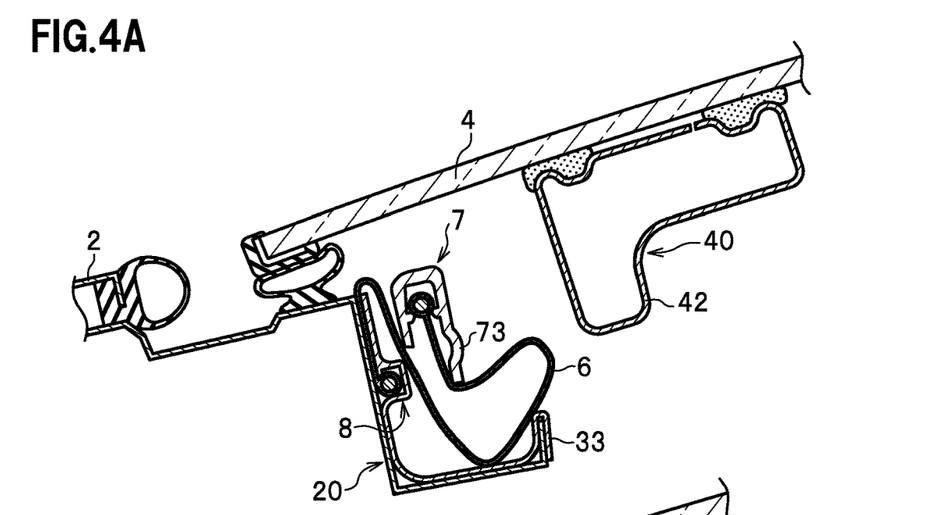
FIG. 4A is a cross-sectional view showing a state at the time when a reinforcement member comes close to an opening portion of the housing section.
Figure 4B:
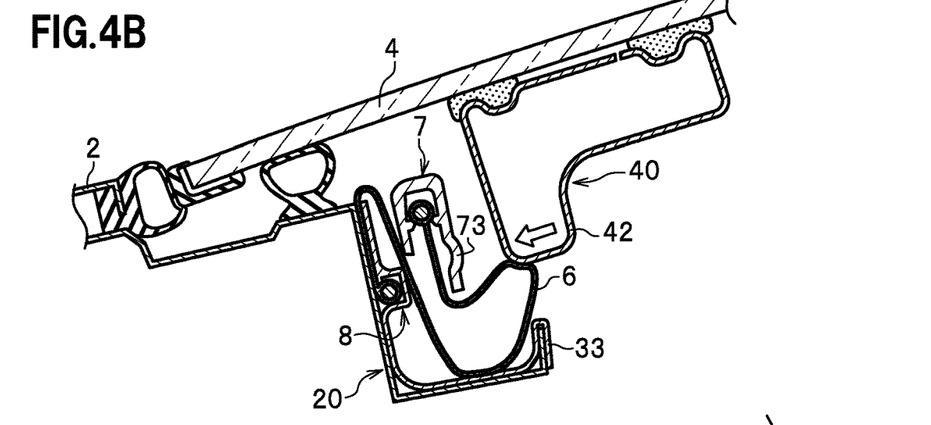
FIG. 4B is a cross-sectional view showing a state at the time when the reinforcement member has entered the opening portion.

As shown in FIG. 4A, if a part of the thin cloth member 6 is backward out of the housing section 20, then as shown in FIG. 4B, the part of the thin cloth member 6, the part being out of the housing section 20, is pushed toward the inside of the housing section 20 by the action of the reinforcement member 40 (protruding portion 42) of the roof panel 4. In other words, when the roof panel 4 is closed, the reinforcement member 40 (protruding portion 42) enters the housing section 20, and the reinforcement member 40 (protruding portion 42) comes into contact with the part of the thin cloth member 6, the part being out of the housing section 20. Thus, the part of the thin cloth member 6, the part having been out of the housing section 20, is pushed into the housing section 20. That is, accompanying the operation of closing the roof panel 4, the part of the thin cloth member 6, the part having been out of the housing section 20, is satisfactorily housed into the housing section 20.

Figure 4C:
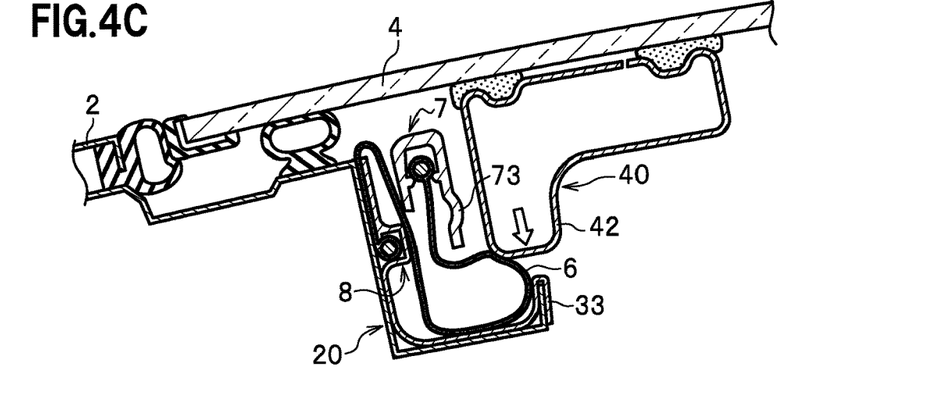
FIG. 4C is a cross-sectional view showing a state at the time when the roof panel is closed.

Thereafter, as shown in FIG. 4C, if the roof panel 4 is tilt down, the reinforcement member 40 (protruding portion 42) moves downward, accompanying the downward motion of the roof panel 4, and the thin cloth member 6 is pushed from above. Thus, the thin cloth member 6 is surely pushed in to the housing section 20 (into the region A1, see FIG. 3) so that the part of the thin cloth member 6, the part having been out of the housing section 20, is satisfactorily housed in the housing section 20.

As described above, it is possible to dispose the lower holder 8 and the upper holder 7 respectively lower and upper in the housing section 20, and the space in the front-rear direction in the vehicle body can be saved. Further, compared with a case that the lower holder 8 and the upper holder 7 are disposed in the front-rear direction of the vehicle body, as the upper holder 7 can be disposed on the front side of the housing section 20, it is possible to correspondingly inhibit the thin cloth member 6 from becoming out backward.

Further, the thin cloth member 6 is guided by the above extension portion from the lower holder 8 to the upper end portion 20a of the housing section 20 and then folded to be housed into the housing section 20. Accordingly, it is possible to effectively use the housing space in the upper-lower direction of the housing section 20 in housing the thin cloth member 6. Still further, the exposure of the thin cloth member 6 into the vehicle compartment can be reduced without making the housing space large.

Still further, by the rear portion 73 of the upper holder 7, it is possible to satisfactorily inhibit the thin cloth member 6 from becoming backward out. Yet further, by the rear portion 73, the thin cloth member 6 connected to the upper holder 7 is effectively guided to the region, which is located lower than the lower holder 8, so that when the roof panel 4 is closed, it is possible to inhibit the thin cloth member 6 from expanding posterior than the upper holder 7 in the process where the upper holder 7 is housed into the housing section 20.

Further, when the roof panel 4 is closed, as the rear portion 73 overlaps with the lower holder 8 in the front-rear direction, it is possible to further satisfactorily inhibit the thin cloth member 6 from becoming out backward, while saving the space, in the front-rear direction, in the vehicle body.

Yet further, as the roof panel 4 is provided with the reinforcement member 40, even if a part of the thin cloth member 6 becomes backward out of the housing section 20 when the thin cloth member 6 is folded, the thin cloth member 6 can be housed in the housing section 20, being pushed by the reinforcement member 40. It is thereby possible to inhibit the thin cloth member 6 from being exposed into the vehicle compartment without making the housing space large.

Still further, not only the thin cloth member 6 is ensured to be housed into the housing section 20 by the protruding portion 42 of the reinforcement member 40, but also the stiffness of the reinforcement member 40 and further the stiffness of the roof panel 4 improve.

An embodiment according to the invention was described above, however, the invention is not limited thereto, and as follows for example, various modifications and changes can be made.

For example, the lower holder 8 was arranged integrally with the attaching member 30, however, without being limited thereto, a separate member attached to the housing section 20 may be adopted for the structure.

Yet further, the housing section 20 was described as one having a cross-section substantially in an L-shape, however, without being limited thereto, various shapes can be adopted.

The extension portion formed by the attaching member 30 was described, however, without being limited thereto, a different member attached to the housing section 20 may be adopted. Further, the extension position of the thin cloth member 6 by the extension portion was described as the upper end portion 20a of the housing section 20, however, without being limited thereto, anyone can be adopted as long as it is guided out from a position without interference with the upper holder 7 on the upper side of the lower holder 8.

DESCRIPTION OF REFERENCE SYMBOLS

1: sunroof device
4: roof panel
5: deflector
6: thin cloth member
7: upper holder
8: lower holder
10: sunshade device
20: housing section
30: attaching member
31: front plate (extension portion)
32: bottom plate
33a: rear surface (rear end portion of the housing section)
40: reinforcement member
42: protruding portion
71: upper portion
72: front portion
73: rear portion
73a: lower end portion
A1: region

The invention claimed is:

1. A deflector structure for a sunroof device, comprising:
a thin cloth member that extends in a tensioned state to smooth a drive airflow when a roof panel is opened, and is folded when the roof panel is closed;
a housing section that is disposed below the roof panel and provided with a front wall, a bottom wall, and a rear wall to house the folded thin cloth member;
a lower holder provided at the housing section to fix a lower end portion of the thin cloth member; and
an upper holder that is fixed at an upper end portion of the thin cloth member, and is housed together with the thin cloth member into the housing section when the roof panel is closed,
wherein, in the housing section, an extension portion that guides the thin cloth member, the thin cloth member having been guided out from the lower holder, to an upper portion of the housing section through a gap formed between the extension portion and a rear surface of the front wall is provided on an upper side of the lower holder.

2. The deflector structure for a sunroof device according to claim 1,
wherein the upper holder includes an upper portion, a front portion extending downward from a front end of the upper portion, and a rear portion extending downward from a rear end of the upper portion, and wherein the rear portion is formed longer in an upper-lower direction than the front portion.

3. The deflector structure for a sunroof device according to claim 2,
wherein, when the roof panel is closed, the rear portion overlaps with the lower holder in the front-rear direction.

4. The deflector structure for a sunroof device according to claim 1, comprising:
a reinforcement member that is arranged on a lower side of a front portion of the roof panel to reinforce the roof pane,
wherein, accompanying an operation in which the roof panel is closed, the reinforcement member enters a region that is located lower than a lower end portion of the upper holder housed in the housing section and anterior than a rear end portion of the housing section.

* * * * *